United States Patent
Wang et al.

(10) Patent No.: US 9,952,641 B1
(45) Date of Patent: Apr. 24, 2018

(54) ELECTRONIC DEVICE

(71) Applicant: Acer Incorporated, New Taipei (TW)

(72) Inventors: Yu-Shih Wang, New Taipei (TW); Chih-Chun Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/671,165

(22) Filed: Aug. 8, 2017

(30) Foreign Application Priority Data

Jan. 11, 2017 (TW) .................................. 106100803

(51) Int. Cl.
| | |
|---|---|
| *H05K 5/00* | (2006.01) |
| *G06F 1/26* | (2006.01) |
| *H01R 13/44* | (2006.01) |
| *H01R 12/53* | (2011.01) |
| *H01R 24/50* | (2011.01) |
| *H01R 13/64* | (2006.01) |
| *G06F 1/16* | (2006.01) |
| *H01R 103/00* | (2006.01) |

(52) U.S. Cl.
CPC .............. *G06F 1/26* (2013.01); *H01R 12/53* (2013.01); *H01R 13/44* (2013.01); *H01R 13/64* (2013.01); *H01R 24/50* (2013.01); *G06F 1/1616* (2013.01); *H01R 2103/00* (2013.01); *H01R 2201/06* (2013.01)

(58) Field of Classification Search
CPC ............................ H01R 2201/06; H02G 3/088
USPC ......................................... 439/76.1, 502, 682
See application file for complete search history.

(56) References Cited

U.S. PATENT DOCUMENTS

| | | | | | |
|---|---|---|---|---|---|
| 4,488,201 | A | * | 12/1984 | Webb ................... | H01H 9/0011 323/346 |
| 4,922,125 | A | * | 5/1990 | Casanova ............ | H05K 7/1449 307/147 |
| 5,091,826 | A | * | 2/1992 | Arnett .................. | H01R 4/2429 174/261 |
| 5,217,394 | A | * | 6/1993 | Ho ......................... | H01R 12/62 439/541.5 |
| 5,248,267 | A | * | 9/1993 | Weng ..................... | H01R 24/62 439/676 |

(Continued)

FOREIGN PATENT DOCUMENTS

| | | |
|---|---|---|
| TW | M255556 | 1/2005 |
| TW | M263667 | 5/2005 |

(Continued)

*Primary Examiner* — Neil Abrams
(74) *Attorney, Agent, or Firm* — JCIPRNET

(57) ABSTRACT

An electronic device includes a display device and a base unit including a casing, a circuit board and a system connector. The system connector includes a system input terminal, a system positive terminal, a system negative terminal, system positive lines, system negative lines and a system detection line. The system input terminal is disposed corresponding to an opening of the casing, and the system positive terminal and the system negative terminal are electrically connected to the circuit board. The system positive lines are connected between the system input terminal and the system positive terminal, and the system negative lines and the system detection line are connected between the system input terminal and the system negative terminal. The system input terminal, the system positive terminal and the system negative terminal are non-overlapping in their orthographic projections on the casing.

10 Claims, 7 Drawing Sheets

(56) References Cited

U.S. PATENT DOCUMENTS

| | | | | |
|---|---|---|---|---|
| 6,125,034 A * | 9/2000 | Bovio | | G06F 1/1616 |
| | | | | 361/679.32 |
| 6,129,598 A * | 10/2000 | Yu | | G06F 1/189 |
| | | | | 307/28 |
| 6,256,881 B1 * | 7/2001 | Starkey | | B29C 33/0083 |
| | | | | 29/856 |
| 6,347,949 B1 * | 2/2002 | Edwards | | H01R 29/00 |
| | | | | 439/170 |
| 6,511,328 B2 * | 1/2003 | Molus | | H01R 13/741 |
| | | | | 439/502 |
| 6,537,085 B2 * | 3/2003 | Na | | H05K 1/147 |
| | | | | 439/564 |
| 6,888,727 B2 * | 5/2005 | Chang | | G06F 1/184 |
| | | | | 174/50.52 |
| 6,921,281 B2 * | 7/2005 | Chen | | H01R 13/5825 |
| | | | | 439/447 |
| 6,979,232 B2 * | 12/2005 | Sato | | H01R 13/64 |
| | | | | 439/676 |
| 7,175,443 B2 * | 2/2007 | Mizuno | | H01R 13/56 |
| | | | | 439/374 |
| 7,382,614 B2 * | 6/2008 | Lee | | G06F 1/184 |
| | | | | 361/679.41 |
| 7,483,262 B2 * | 1/2009 | Yin | | G06F 1/1616 |
| | | | | 361/679.01 |
| 7,525,810 B2 * | 4/2009 | Jiang | | H01R 13/74 |
| | | | | 361/752 |
| 7,946,859 B1 * | 5/2011 | Tseng | | H05K 5/0026 |
| | | | | 439/676 |
| 8,247,706 B2 * | 8/2012 | Liao | | H05K 5/00 |
| | | | | 174/360 |
| 8,279,594 B2 * | 10/2012 | Chen | | G06F 13/4022 |
| | | | | 361/679.4 |
| 8,506,327 B2 * | 8/2013 | Jol | | B29C 45/1671 |
| | | | | 264/272.11 |
| 8,814,600 B2 * | 8/2014 | Watanabe | | H01R 13/7033 |
| | | | | 439/620.09 |
| 8,840,423 B2 * | 9/2014 | Hoshi | | H01R 13/648 |
| | | | | 361/679.4 |
| 8,875,389 B2 * | 11/2014 | Kan | | H01R 13/501 |
| | | | | 29/825 |
| 8,888,509 B2 * | 11/2014 | Colwell | | H01R 13/719 |
| | | | | 439/76.1 |
| 8,936,483 B2 * | 1/2015 | Saunders | | H01R 13/627 |
| | | | | 439/351 |
| 9,236,687 B2 * | 1/2016 | Aldereguia | | H01R 13/633 |
| 9,559,446 B1 * | 1/2017 | Wetzel | | H01R 12/7088 |
| 9,722,331 B2 * | 8/2017 | Joo | | H01R 9/2491 |
| 2003/0220009 A1 * | 11/2003 | Takeguchi | | H01R 12/7005 |
| | | | | 439/374 |
| 2004/0248462 A1 * | 12/2004 | Dyer | | H01R 29/00 |
| | | | | 439/502 |
| 2015/0138727 A1 * | 5/2015 | Lin | | G06F 1/1656 |
| | | | | 361/679.56 |

FOREIGN PATENT DOCUMENTS

| | | |
|---|---|---|
| TW | M272283 | 8/2005 |
| TW | M272284 | 8/2005 |

* cited by examiner

ELECTRONIC DEVICE

CROSS-REFERENCE TO RELATED APPLICATION

This application claims the priority benefit of Taiwan application serial no. 106100803, filed on Jan. 11, 2017. The entirety of the above-mentioned patent application is hereby incorporated by reference herein and made a part of this specification.

BACKGROUND OF THE INVENTION

Field of the Invention

The invention relates to an electronic device and particularly relates to an electronic device that has greater safety.

Description of Related Art

Currently, the power source of a laptop computer is mostly provided by an external power supply device, and a DC-in jack of a laptop computer receives power of approximately 360 watts only. In order to achieve high power, the laptop computer is usually provided with two DC-in jacks therein, so that the electronic device can achieve a high power of 500 watts or more. However, since a user must insert two DC-in plugs simultaneously in order to attain the highest performance, if the user only inserts the first DC-in plug and forgets to insert the second DC-in plug, the performance of the electronic device then becomes halved.

Furthermore, since two DC-in jacks need to be set up, structure becomes more complicated, mold making becomes more difficult, and problems such as a greater loss of process tolerance, higher manufacturing costs and decreased structural strength will easily ensue. Besides, currently the system input terminal, the system positive lines and the system negative lines of the DC-in jack inside the laptop computer are all disposed on the circuit board. That is to say, an orthographic projection of the system input terminal on the circuit board overlaps with orthographic projections of the system positive lines and the system negative lines on the circuit board. However, in the above design, the system positive lines and the system negative lines are limited by the size of the circuit board so that the signal lines cannot be shunted from each another. Therefore, not only is it easy to result in a short circuit and generate sparks and thus lead to safety concerns, but high density of the components disposed on the circuit board also causes problems of poor heat dissipation.

SUMMARY OF THE INVENTION

The invention provides an electronic device adapted to be electrically connected to a power connector of a power supply device by a system connector, so as to achieve a high power of 500 watts or more.

The electronic device of this invention is adapted to be electrically connected to a power supply device. The power supply device includes a power connector. The electronic device includes a display unit and a base unit. The base unit is pivoted to the display unit and includes a casing, a circuit board and a system connector. The casing has an opening, and the circuit board and the system connector are disposed inside the casing. The system connector includes a system input terminal, a system positive terminal, a system negative terminal, a plurality of system positive lines, a plurality of system negative lines and a system detection line. The system input terminal is disposed corresponding to the opening, and the system positive terminal and the system negative terminal are disposed on the circuit board separately from each other and are electrically connected to the circuit board. The plurality of system positive lines are connected between the system input terminal and the system positive terminal, and the plurality of system negative lines and the system detection line are connected between the system input terminal and the system negative terminal. An orthographic projection of the system input terminal on the casing does not overlap with orthographic projections of the system positive terminal and the system negative terminal on the casing. The power connector of the power supply device is suitable for being inserted to the system connector of the base unit so as to provide a power source to the circuit board.

In an embodiment of the invention, a number of the plurality of system negative lines is the same of a number of the plurality of system positive lines, and a cross-section area of the system positive terminal is smaller than a cross-sectional area of the system negative terminal.

In an embodiment of the invention, the system input terminal of the system connector has a first protrusion and a second protrusion. The casing includes a fixing base having first fixing portion and a second fixing portion disposed near the opening. The first protrusion and the second protrusion of the system input terminal are respectively inserted to the first fixing portion and the second fixing portion of the fixing base along an assembling direction so as to fix the system connector onto the casing.

In an embodiment of the invention, a surface area of the first protrusion is larger than a surface area of the second protrusion, and the assembling direction is perpendicular to an extending direction of the plurality of system positive lines and the plurality of system negative lines.

In an embodiment of the invention, the base unit further includes a metal cover disposed on the system input terminal and locked to the fixing base.

In an embodiment of the invention, the power connector includes a power input terminal, a plurality of power positive lines, a plurality of power negative lines and a power detection line. The plurality of power positive lines, the plurality of power negative lines and the power detection line are electrically connected to the power input terminal.

In an embodiment of the invention, the power input terminal includes a power positive pin, a power negative pin and a power detection pin. The system input terminal includes a system positive pin, a system negative pin and a system detection pin. The power positive pin, the power negative pin and the power detection pin are correspondingly inserted into the system positive pin, the system negative pin and the system detection pin respectively.

In an embodiment of the invention, the power positive pin is connected to the plurality of power positive lines, the power negative pin is connected to the plurality of power negative lines, and the power detection pin is connected to the power detection line.

In an embodiment of the invention, the power connector further includes a power tube and a power mold. The plurality of power positive lines, the plurality of power negative lines and the power detection line are housed inside the power tube. The power mold is sleeved between the power tube and the power input terminal, and an extending direction of the power tube is perpendicular to an extending direction of the power input terminal.

In an embodiment of the invention, the system connector further includes a positive tube and a negative tube. The plurality of system positive lines are housed inside the positive tube, and the plurality of system negative lines and the system detection line are housed inside the negative tube.

Based on the above, according to the design of the electronic device of this invention, the system input terminal and the system positive terminal of the system connector are connected by the system positive lines, and the system input terminal and the system negative terminal are electrically connected by the system negative lines and the system detection line. Besides, an orthographic projection of the system input terminal on the casing does not overlap with orthographic projections of the system positive terminal and the system negative terminal on the casing. Accordingly, in the electronic device of this invention, the system positive lines and the system negative lines of the system connector have a larger layout space, and the system positive terminal and the system negative terminal adopt a shunt design on the circuit board, so as to solve prior-art problems of short circuit and poor heat dissipation. On the other hand, since more currents pass through when cross-sectional areas of signal lines are larger, the system positive lines and the system negative lines in the above design are not limited by the size of the circuit board. Therefore, by adjusting cross-sectional areas of the system positive lines and the system negative lines, a high power of 500 watts or more is achievable. Furthermore, in this invention, the system connector has the system detection line, and thus has a function of detecting signals actively and is capable of preventing sparks from occurring. Besides, the electronic device of this invention is electrically connected to a power connector of the power supply device by one system connector only. As a result, in comparison to prior art electronic devices, by reducing one connector for use, not only is a high power of 500 watts or more achieved so as to bring down manufacturing costs, but structurally speaking simplification in structure reduces a loss of tolerance and manufacturing difficulties and increases overall structural strength.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
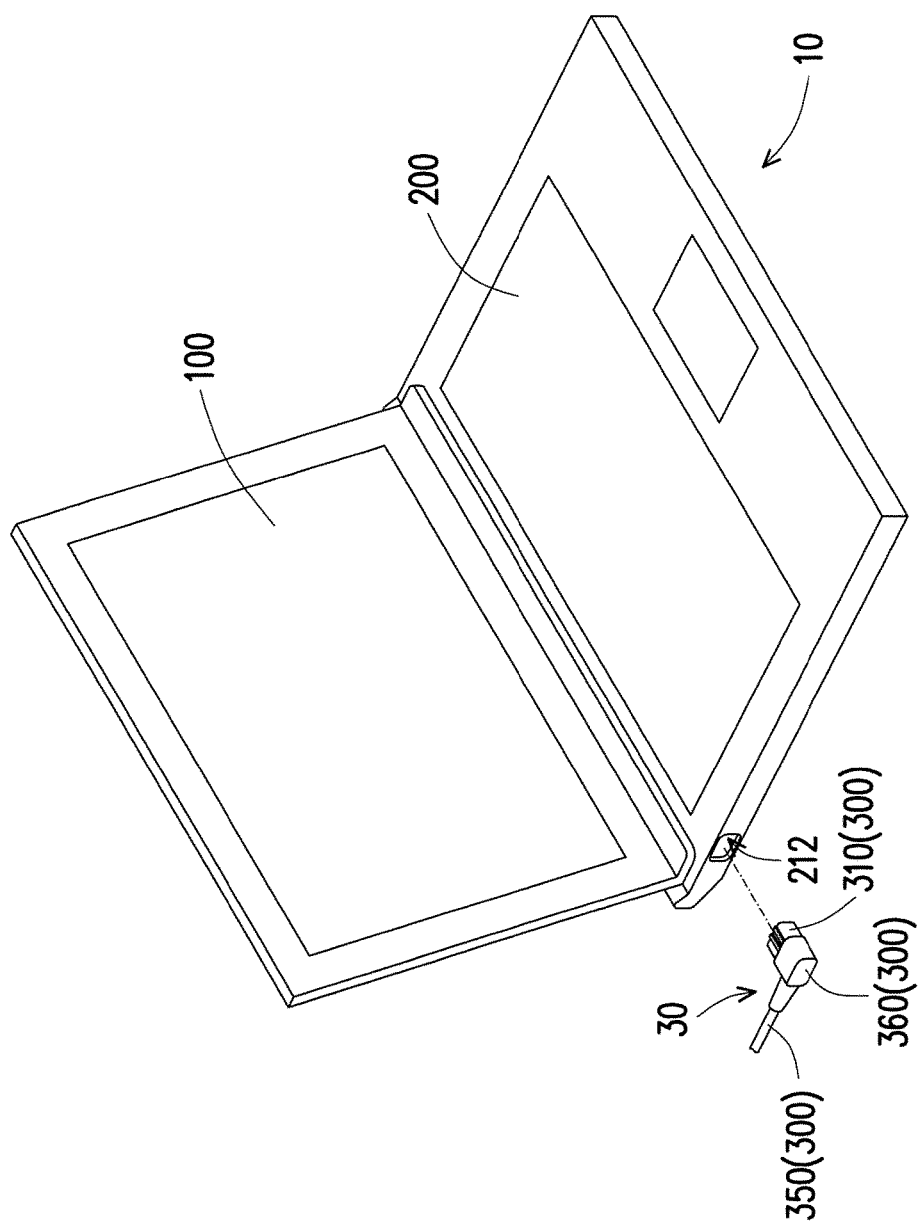
FIG. 1A illustrates a schematic view of an electronic device according to an embodiment of the invention.
Figure 1B:
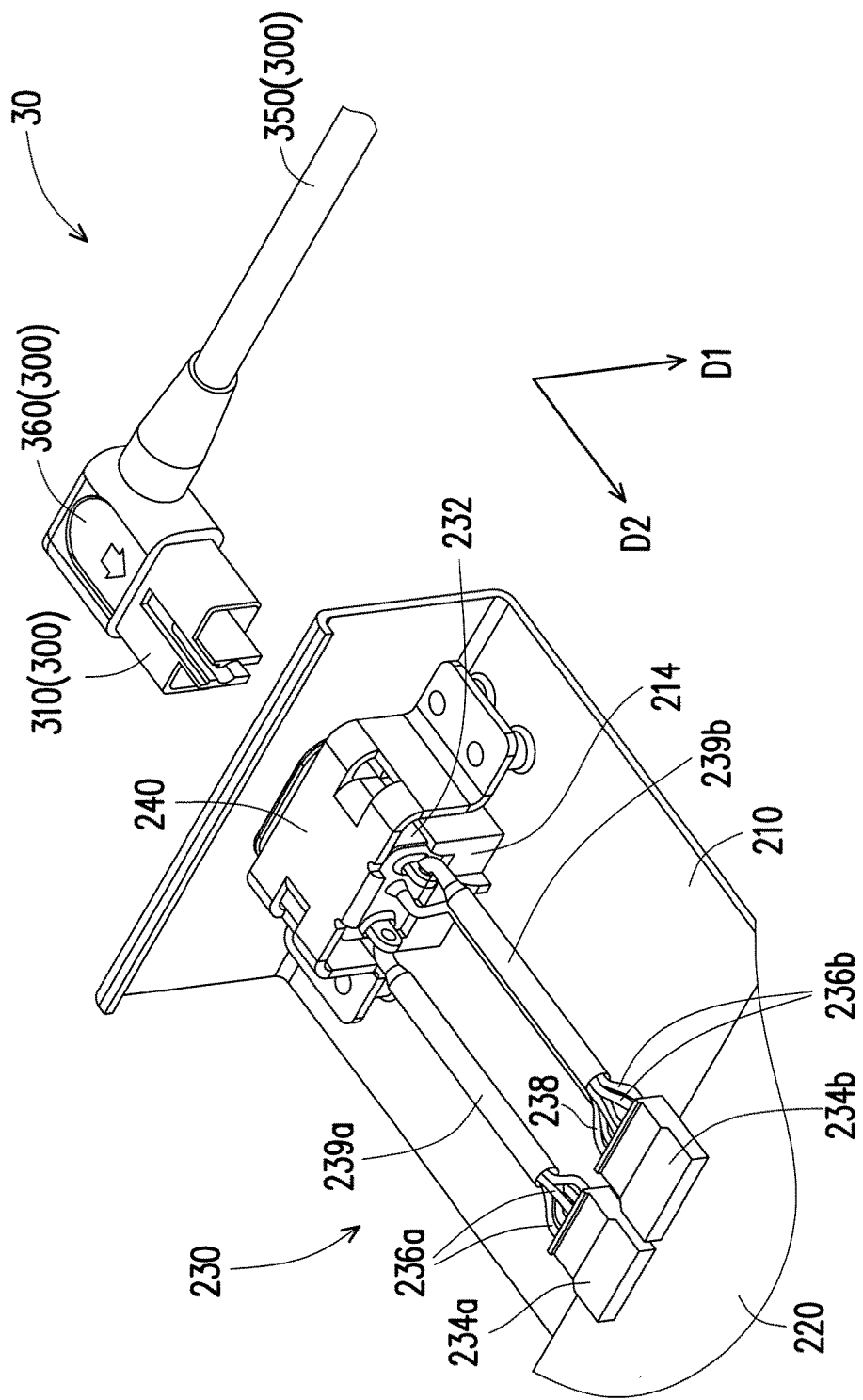
FIG. 1B illustrates a partially enlarged schematic view of the power supply device and the base unit of FIG. 1A.
Figure 1C:
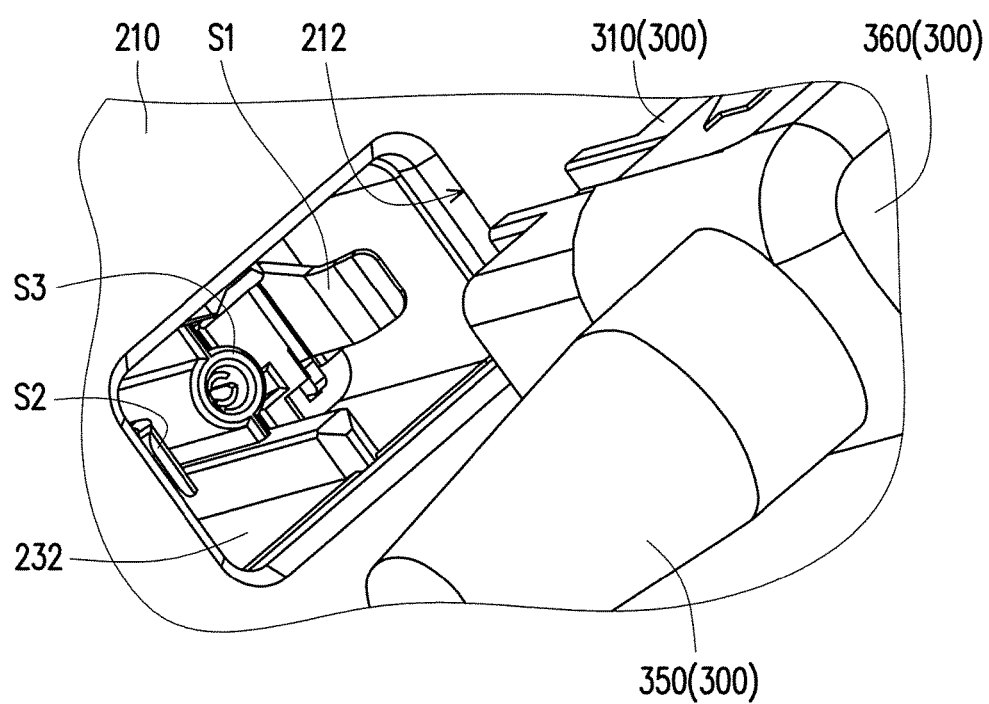
FIG. 1C illustrates a schematic view of the power supply device and the base unit of FIG. 1B from another perspective.
Figure 2:
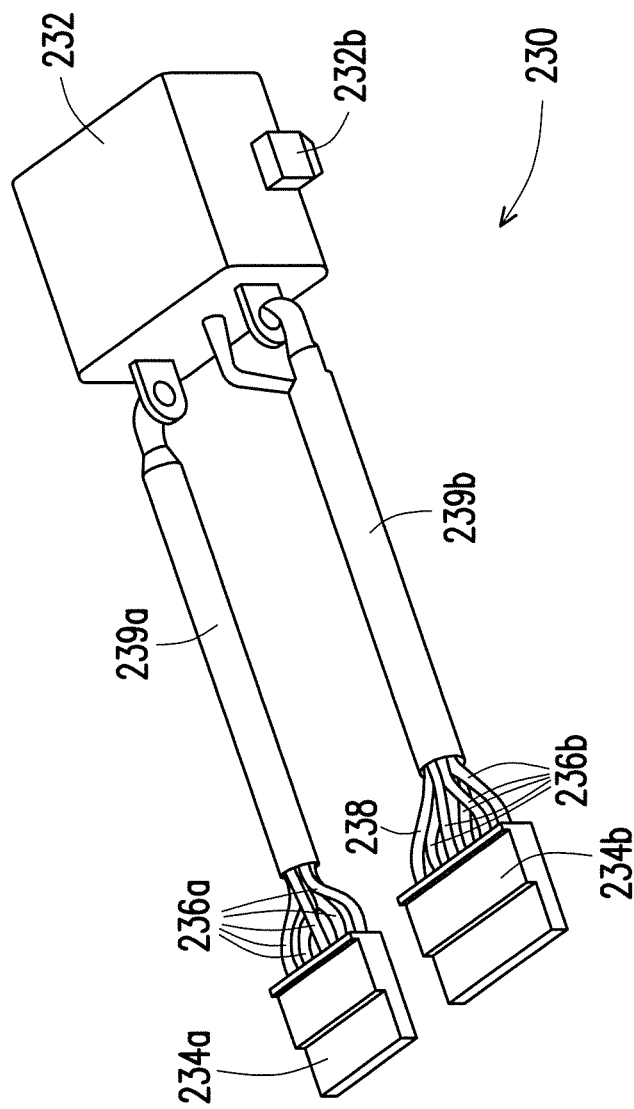
FIG. 2 illustrates a schematic view of the system connector of FIG. 1A.
Figure 3:
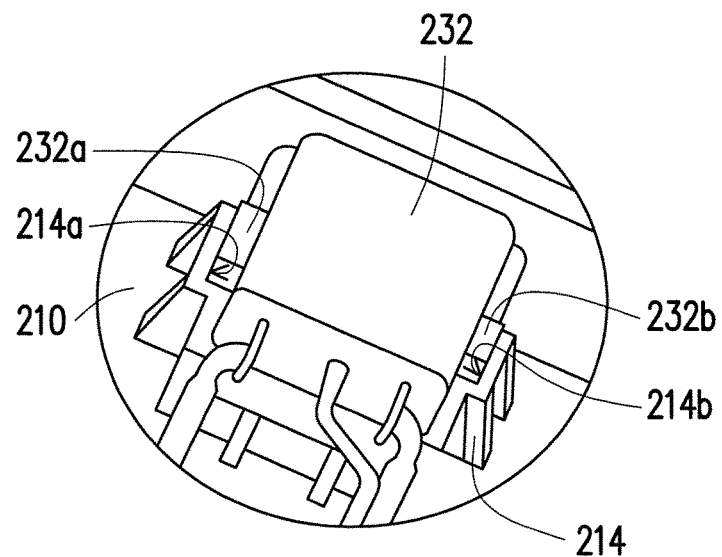
FIG. 3 illustrates an enlarged schematic view of the fixing base of the casing and the system input terminal of the system connector of FIG. 1A.
Figure 4:
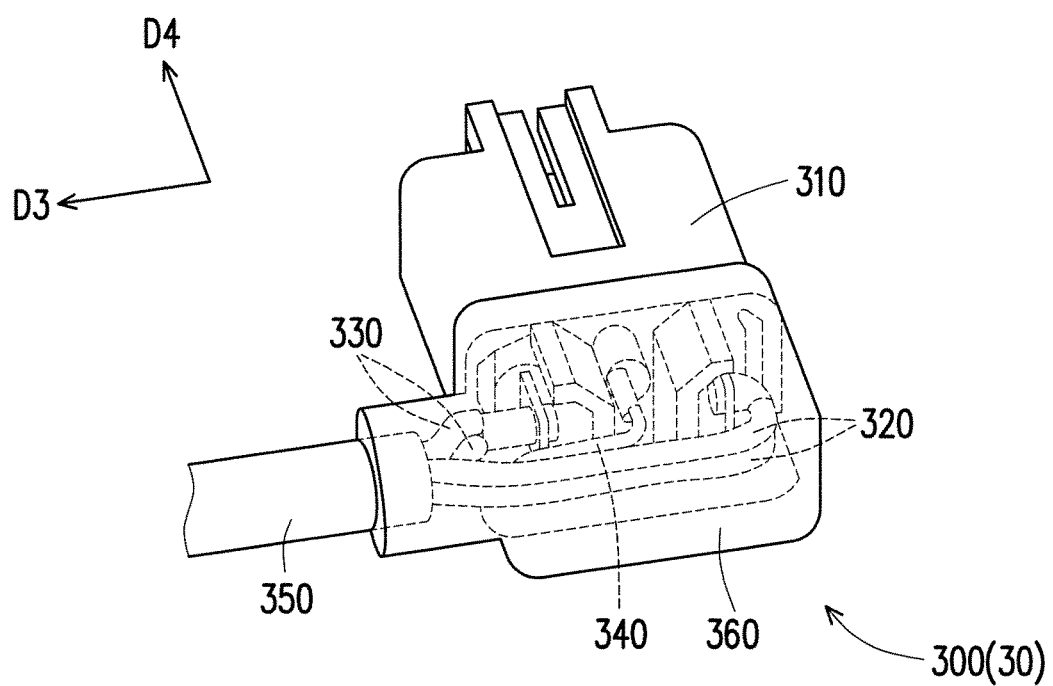
FIG. 4 illustrates a schematic view of the power connector of FIG. 1A.
Figure 5A:
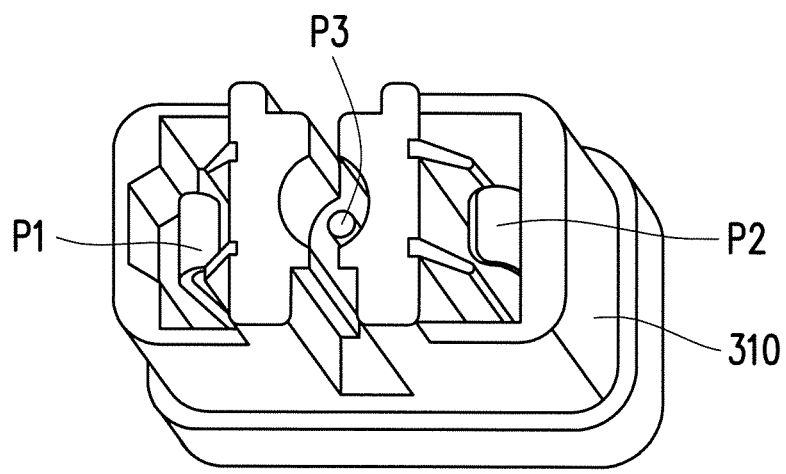
FIG. 5A and FIG. 5B illustrate the power connector of FIG. 1A from different perspectives respectively.
Figure 5B:
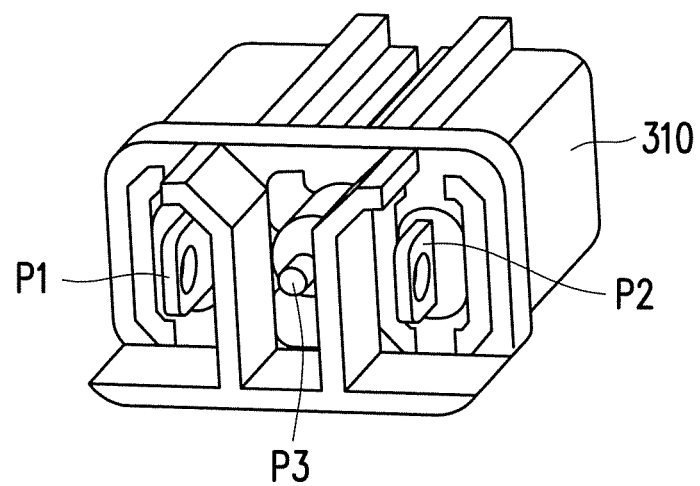
Figure 5C:
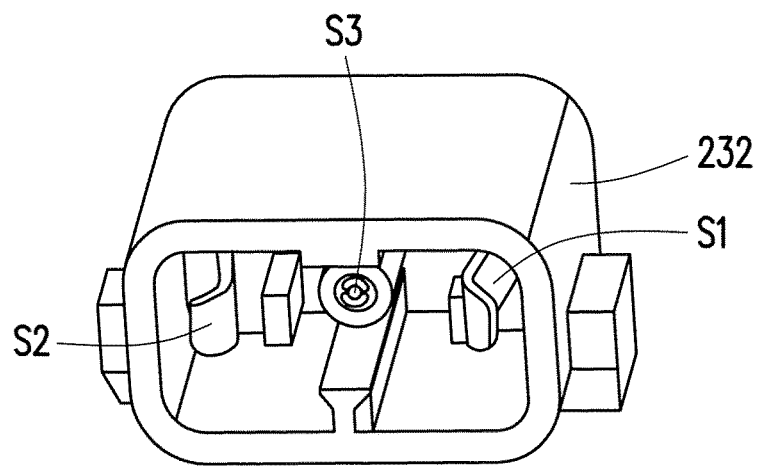
FIG. 5C and FIG. 5D illustrate the system connector of FIG. 1A from different perspectives respectively.
Figure 5D:
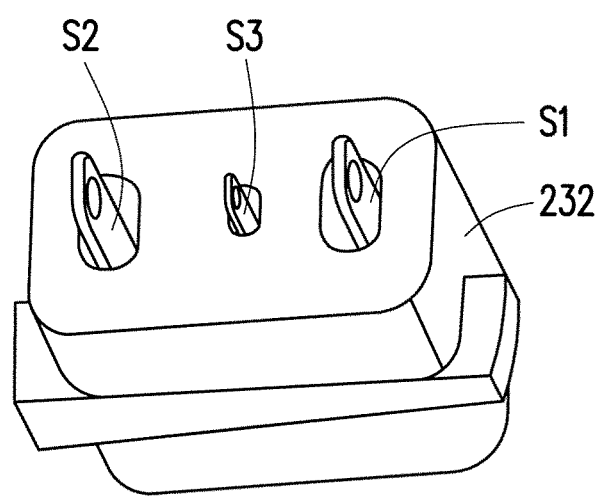

FIG. 1A illustrates a schematic view of an electronic device according to an embodiment of the invention. FIG. 1B illustrates a partially enlarged schematic view of the power supply device and the base unit of FIG. 1A. FIG. 1C illustrates a schematic view of the power supply device and the base unit of FIG. 1B from another perspective. FIG. 2 illustrates a schematic view of the system connector of FIG. 1A. FIG. 3 illustrates an enlarged schematic view of the fixing base of the casing and the system input terminal of the system connector of FIG. 1A. FIG. 4 illustrates a schematic view of the power connector of FIG. 1A. FIG. 5A and FIG. 5B illustrate the power connector of FIG. 1A from different perspectives respectively. FIG. 5C and FIG. 5D illustrate the system connector of FIG. 1A from different perspectives respectively.

First, with reference to FIG. 1A, FIG. 1B, FIG. 1C and FIG. 2 simultaneously, in this embodiment, an electronic device 10 is adapted to be electrically connected to a power supply device 30, and the electronic device 30 includes a power connector 300. Herein, the electronic device 10 is, for example, a laptop computer, but the invention is not limited thereto. In this embodiment, the electronic device 10 includes a display unit 100 and a base unit 200. Herein, the display unit 100 is, for example, a monitor of a laptop computer and the base unit 200 is, for example, a host of a laptop computer, but the invention is not limited thereto. The base unit 200 is pivoted to the display unit 100, and the base unit 200 folds or unfolds corresponding to the display unit 100. Herein, the base unit 200 includes a casing 210, a circuit board 220 and a system connector 230. The casing 210 has an opening 212, and the circuit board 220 and the system connector 230 are disposed inside the casing 210.

With reference to FIG. 2 again, in this embodiment, the system connector 230 includes a system input terminal 232, a system positive terminal 234a, a system negative terminal 234b, a plurality of system positive lines 236a, a plurality of system negative lines 236b and a system detection line 238. As shown in FIG. 1B and FIG. 1C, the system input terminal 232 is located inside the casing 210 and disposed corresponding to the opening 212 of the casing 210. The system positive terminal 234a and the system negative terminal 234b are disposed on the circuit board 220 separately from each other and are electrically connected to the circuit board 220. The system positive lines 236a are connected between the system input terminal 232 and the system positive terminal 234a, and the system negative lines 236b and the system detection line 238 are connected between the system input terminal 232 and the system negative terminal 234b. An orthographic projection of the system input terminal 232 on the casing 210 does not overlap with orthographic projections of the system positive terminal 234a and the system negative terminal 234b on the casing 210. The power connector 300 of the power supply device 30 is suitable for being inserted to the system connector 230 of the base unit 200 so as to provide a power source to the circuit board 220.

More specifically, with reference to FIG. 1B, FIG. 2 and FIG. 3 again, in this embodiment, the system input terminal 232 of the system connector 230 has a first protrusion 232a and a second protrusion 232b. The casing 210 includes a fixing base 214 having a first fixing portion 214a and a second fixing portion 214b disposed near the opening 212. Here, the first fixing portion 214a and the second fixing portion 214b are respectively embodied as a cavity structure. The first protrusion 232a and the second protrusion 232b of the system input terminal 232 are respectively inserted into the first fixing portion 214a and the second fixing portion 214b of the fixing base 214 along an assembling direction D1, so as to fix the system connector 230 onto the casing 210. Herein, the assembling direction D1 is perpendicular to an extending direction D2 of the system positive lines 236a and the system negative lines 236b. Therefore, in this embodiment, the system input terminal 232 and the system positive lines 236a and the system negative lines 236b are not perpendicularly stacked on the circuit board 220. As a result, the system positive lines 236a and the system negative lines 236b have a larger layout space on the circuit board 220, so that a short circuit of positive and negative terminals and sparks caused therefrom are prevented and greater safety is attained.

Furthermore, because the system positive lines 236a and the system negative lines 236b have a larger layout space on the circuit board 220, by adjusting cross-sectional areas of the system positive lines 236a and the system negative lines 236b, the electronic device 100 thus achieves a high power of 500 watts or more based on the principle that more currents pass through when cross-sectional areas of signal lines are larger. Besides, in the system connector 230 of this embodiment, the system input terminal 232 and the system positive terminal 234a are electrically connected by the system positive lines 236a, and the system input terminal 232 and the system negative terminal 234b are electrically connected by the system negative lines 236b and the system detection line 238. Therefore, in the system connector 230 of this embodiment, the system positive terminal 234a and the system negative terminal 234b have a shunt design on the circuit board 220, so as to solve prior-art problems of short circuit and poor heat dissipation.

This embodiment certainly is not limited to the layout in which the system input terminal 232 has a protrusion structure and the fixing base 214 has an indentation structure. In other embodiments not shown, the system input terminal may have a first indentation and a second indentation, the fixing base of the casing may have a first protrusion and a second protrusion, and the first indentation and the second indentation of the system input terminal are respectively inserted into the first protrusion and the second protrusion of the fixing base along an assembling direction. The above design still falls within the protective scope as claimed by this invention.

Please refer to FIG. 3 again. Particularly, in the system input terminal 232 of this embodiment, a surface of the first protrusion 232a is larger than a surface of the second protrusion 232b. Herein, the first fixing portion 214a and the second fixing portion 214b of the fixing base 214 are disposed corresponding to the first protrusion 232a and the second protrusion 232b of the system input terminal 232 respectively. As a result, an accommodating space of the first fixing portion 214a is larger than an accommodating space of the second fixing portion 214b. The first protrusion 232a and the second protrusion 232b are designed to have different sizes of surface area, so as to effectively prevent a user from assembling the components reversely and have a foolproof function.

Furthermore, in the system connector 230 of this embodiment, a number of the system negative lines 236b is the same of a number of the system positive lines 236a. As shown in FIG. 2, the number of the system negative lines 236b and the number of the system positive lines 236a are both five respectively. The system negative lines 236b and the system detection line 238 are connected between the system input terminal 232 and the system negative terminal 234b, so that the system negative terminal 234b are connected to six system signal lines in total and the system positive terminal 234a are connected to the five system positive lines 236a only. As a result, a cross-sectional area of the system positive terminal 234a is smaller than a cross-sectional area of the system negative terminal 234b. In other words, the system positive terminal 234a and the system negative terminal 234b are connected to different numbers of signal lines, so as to prevent a user from inserting the components wrongly and have a foolproof function.

Then, with reference to FIG. 1B, FIG. 5C and FIG. 5D simultaneously, in this embodiment, the system input terminal 232 includes a system positive pin S1, a system negative pin S2 and a system detection pin S3. The system positive pin S1 is connected to the system positive lines 236a, the system negative pin S2 is connected to the system negative lines 236b, and the system detection pin S3 is connected to the system detection line 238. With reference to FIG. 1B and FIG. 2 again, in this embodiment, the system connector 230 further includes a positive tube 239a and a negative tube 239b. Herein, the system positive lines 236a are housed inside the positive tube 239a, and the system negative lines 236b and the system detection line 238 are housed inside the negative tube 239b. For a better component performance, the base unit 200 of this embodiment further includes a metal cover 240. The metal cover 240 is disposed on the system input terminal 232 and locked to the fixing base 214 by screws. Herein, the metal cover 240 effectively generates an effect of electrostatic discharge protection, so as to prevent the system input terminal 232 of the system connector 230 from being interfered by static electricity.

On the other hand, with reference to FIG. 4, FIG. 5A and FIG. 5B, in this embodiment, the power connector 300 includes a power input terminal 310, a plurality of power positive lines 320, a plurality of power negative lines 330 and a power detection line 340. The power positive lines 320, the power negative lines 330 and the power detection line 340 are electrically connected to the power input terminal 310. With reference to FIG. 1C, FIG. 5A, FIG. 5B, FIG. 5C and FIG. 5D again, the power input terminal 310 includes a power positive pin P1, a power negative pin P2 and a power detection pin P3. Here the power positive pin P1, the power negative pin P2 and the power detection pin P3 are correspondingly inserted into the system positive pin S1, the system negative pin S2 and the system detection pin S3 respectively. The power positive pin P1 is connected to the power positive lines 320, the power negative pin P2 is connected to the power negative lines 330, and the power detection pin P3 is connected to the power detection line 340.

Besides, with reference to FIG. 4 again, in this embodiment, the power connector 300 further includes a power tube 350 and a power mold 360. The power positive lines 320, the power negative lines 330 and the power detection line 340 are housed inside the power tube 350. The power mold 360 is sleeved between the power tube 350 and the power input terminal 310, and an extending direction D3 of the power tube 350 is perpendicular to an extending direction D4 of the power input terminal 310. Accordingly, in this embodiment, the power positive lines 320, the power negative lines 330 and the power detection line 340 are prevented from spreading out at 180 degrees and have a better component performance.

In summary of the above, according to the design of the electronic device of this invention, the system input terminal and the system positive terminal of the system connector are connected by the system positive lines, and the system input terminal and the system negative terminal are electrically connected by the system negative lines and the system detection line. Besides, an orthographic projection of the system input terminal on the casing does not overlap with orthographic projections of the system positive terminal and the system negative terminal on the casing. Accordingly, in the electronic device of this invention, the system positive lines and the system negative lines of the system connector have a larger layout space, and the system positive terminal and the system negative terminal adopt a shunt design on the circuit board, so as to solve prior-art problems of short circuit and poor heat dissipation.

On the other hand, since more currents pass through when cross-sectional areas of signal lines are larger, the system positive lines and the system negative lines in the above design are not limited by the size of the circuit board. Therefore, by adjusting cross-sectional areas of the system positive lines and the system negative lines, a high power of 500 watts or more is achievable. Furthermore, in this invention, the system connector has the system detection line, and thus has a function of detecting signals actively and is capable of preventing sparks from occurring. Besides, the electronic device of this invention is electrically connected to a power connector of the power supply device by one system connector only. As a result, in comparison to prior art electronic devices, by reducing one connector for use, not only is a high power of 500 watts or more achieved so as to bring down manufacturing costs, but structurally speaking simplification in structure reduces a loss of tolerance and manufacturing difficulties and increases overall structural strength.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. An electronic device adapted to be electrically connected to a power supply device that comprises a power connector, the electronic device comprising:
    a display unit; and
    a base unit, pivoted to the display unit and comprising a casing, a circuit board and a system connector, wherein the casing has an opening, the circuit board and the system connector are disposed inside the casing, and the system connector comprising a system input terminal, a system positive terminal, a system negative terminal, a plurality of system positive lines, a plurality of system negative lines and a system detection line, wherein the system input terminal is disposed correspondingly to the opening, the system positive terminal and the system negative terminal are disposed on the circuit board separately from each other and are electrically connected to the circuit board, the plurality of system positive lines are connected between the system input terminal and the system positive terminal, and the plurality of system negative lines and the system detection line are connected between the system input terminal and the system negative terminal, wherein an orthographic projection of the system input terminal on the casing does not overlap with orthographic projections of the system positive terminal and the system negative terminal on the casing, and the power connector of the power supply device is suitable for being inserted to the system connector of the base unit so as to provide a power source to the circuit board.

2. The electronic device as recited in claim 1, wherein a number of the plurality of system negative lines is the same of a number of the plurality of system positive lines, and a cross-sectional area of the system positive terminal is smaller than a cross-sectional area of the system negative terminal.

3. The electronic device as recited in claim 1, wherein the system input terminal of the system connector has a first protrusion and a second protrusion, the casing comprises a fixing base having a first fixing portion and a second fixing portion disposed near the opening, and the first protrusion and the second protrusion of the system input terminal are respectively inserted to the first fixing portion and the second fixing portion of the fixing base along an assembling direction so as to fix the system connector onto the casing.

4. The electronic device as recited in claim 3, wherein a surface area of the first protrusion is larger than a surface of the second protrusion, and the assembling direction is perpendicular to an extending direction of the plurality of system positive lines and the plurality of system negative lines.

5. The electronic device as recited in claim 3, wherein the base unit further comprises a metal cover disposed on the system input terminal and locked to the fixing base.

6. The electronic device as recited in claim 1, wherein the power connector comprises a power input terminal, a plurality of power positive lines, a plurality of power negative lines and a power detection line, and the plurality of power positive lines, the plurality of power negative lines and the power detection line are electrically connected to the power input terminal.

7. The electronic device as recited in claim 6, wherein the power input terminal comprises a power positive pin, a power negative pin and a power detection pin, the system input terminal comprises a system positive pin, a system negative pin and a system detection pin, and the power positive pin, the power negative pin and the power detection pin are correspondingly inserted into the system positive pin, the system negative pin and the system detection pin respectively.

8. The electronic device as recited in claim 7, wherein the power positive pin is connected to the plurality of power positive lines, the power negative pin is connected to the plurality of power negative lines, and the power detection pin is connected to the power detection line.

9. The electronic device as recited in claim 6, wherein the power connector further comprises a power tube and a power mold, the plurality of power positive lines, the plurality of power negative lines and the power detection line are housed inside the power tube, the power mold is sleeved between the power tube and the power input terminal, and an extending direction of the power tube is perpendicular to an extending direction of the power input terminal.

10. The electronic device as recited in claim 1, wherein the system connector further comprises a positive tube and a negative tube, and the plurality of system positive lines are housed inside the positive tube and the plurality of system negative lines and the system detection line are housed inside the negative tube.

\* \* \* \* \*